United States Patent Office 2,822,348
Patented Feb. 4, 1958

2,822,348
ESTER INTERCHANGE CATALYSTS

John Harris Haslam, Wilmington, Del., assignor to E. I. du Pont de Nemours and Company, Wilmington, Del., a corporation of Delaware No Drawing. Application November 14, 1951
Serial No. 256,373

13 Claims. (Cl. 260—75)

This invention relates to ester interchange reactions and more particularly it relates to a new and improved method for the catalysis of these reactions.

Ester interchange reactions broadly comprise the reaction of an ester with another compound, including another ester, to form a different ester than the reactant ester. Such reactions include those esterification reactions heretofore commonly referred to as re-esterification, trans-esterification, ester exchange, and ester disproportionation reactions. This invention relates broadly to such reactions, particularly those involving organic or carboxylic esters. Such reactions are known and include, for example, the reaction between two esters to yield two new esters, and the reaction between an ester and an alcohol to form a new ester and liberate an alcohol. The field also includes ester interchange reactions where the components of the esters involved may be polyhydroxy alcohols and polybasic acids. Thus, molecular rearrangements in the triglycerides or between several glycerides are included. These reactions are equilibrium reactions and it is well known that certain substances of acidic or basic nature will act as catalysts to establish the equilibrium more rapidly at lower temperatures. Moreover, when one of the products of the reaction is relatively quite volatile it may be removed by distillation, thereby forcing the equilibrium to shift toward completion of the reaction. In other cases it is possible to choose conditions which permit the precipitation of an insoluble product as a means of shifting the equilibrium toward a higher yield. The use of catalysts in ester interchange reactions has been found advantageous. Thus, in U. S. Patent 2,442,533 the rearrangement of triglycerides is promoted by such catalysts as sodium methoxide, the alkali metal alkoxides in general, as well as the sodium derivatives of compounds in which the sodium is attached directly to carbon and compounds like potassium pyrrole. All of the aforementioned catalysts are caustic in nature and should be removed from the reaction products. Due to their chemical activity they often cause undesirable side reactions resulting in loss of yield or contamination of product. Less alkaline catalysts such as aluminum isopropoxide, potassium and calcium carbonates have been found effective in some instances, but generally are weaker and less efficient catalytically. Phosphoric acid and sulfonic acids have shown catalytic activity but are undesirable when such functional groups as active ethylenic groups are present in the reactants because of premature polymerization and side reactions.

It is, therefore, an object of this invention to provide a new and improved method for the catalysis of ester interchange reactions.

It is another object of this invention to provide a method for the catalysis of ester interchange reactions whereby such reactions may be speeded up at lower temperatures, objecionable side reactions may be reduced, cleaner products may be produced, and catalyst disposal can be simplified.

Other objects of this invention will appear hereinafter.

The objects of this invention may be accomplished, in general, by conducting an ester interchange reaction in the presence of a titanium organic ester in which a titanium atom is bonded through an oxygen atom to a carbon atom free of any double bond with oxygen. The titanium atom may be so bonded to such a non-carbonyl carbon atom in more than one, for example, in all four of its principal valence positions.

The following examples are given to illustrate, in detail, the process of the present invention by specific embodiments therein set forth, it being understood that this invention is not limited by the details of these examples.

Example I

One mol of ethyl benzoate (150 grams) was placed in a one-liter flask along with 300 grams of dry n-butanol and 7.5 grams of tetraisopropyl titanate. Ordinary care was taken to protect these substances from moisture. The flask was fitted with a heating mantle and a 30-inch packed glass distilling column carrying a reflux ratio controlling head. The reaction mixture was heated to boiling. Vapors were taken off at the still head at 78° C. as fast as the column would allow, that is in excess of 84 ml./hr., until a substantially 100% yield (45 gms.) of ethanol was obtained. The residue was water washed to hydrolyze the catalyst and distilled. One hundred and sixty-two (162) grams of butyl benzoate or 91% of the theoretical amount was recovered.

In a parallel experiment, in which conditions and apparatus were kept substantially identical but using 7.5 grams of aluminum isopropoxide as the catalyst instead of the titanium ester, good yields were obtained but the reaction was considerably slower; the ethanol being released at about 70 ml. per hour.

Example II

Four and one-half mols (396 grams) of dry ethyl acetate were refluxed under a distilling column carrying a reflux controlling head with 150 grams (2.02 mols) of n-butyl alcohol in the presence of 4.4 grams of tetrabutyl titanate using ordinary means of protecting the reagents from moisture. After a very short reflux time the head temperature stabilized at 71° C. indicating the formation of the ethanol-ethyl acetate azeotrope which contained about 30% ethanol. This azeotrope was rapidly distilled off until the head temperature began rising (73–74° C.) when 305 grams of the azeotrope were obtained, corresponding to 91.5 grams of ethanol and 213.5 grams of ethyl acetate. The flask residue was distilled through a fractionating column, yielding 230 grams (1.98 mols) of butyl acetate boiling at 124.5 to 126° C., 760 mm. This corresponds to a 97% yield of butyl acetate from butanol. The azeotrope distilled at the full capacity of the column showing that the interchange reaction was too rapid to be measured by the rate of distillation in the apparatus used.

Example III

In a 10-gallon, enamel-lined kettle equipped with an agitator, a thermometer, and a short, packed fractionation column were placed 585 parts of dry beta-(diethylamino)ethanol, 1500 parts of dry methyl methacrylate, 1.25 parts of phenothiazine (thiodiphenylamine) as a polymerization inhibitor, and 17.5 parts of distilled tetraisopropyl titanate. (The use of phenothiazine as a polymerization inhibitor is no part of this invention.) The charge was heated to reflux and over a period of six hours 276 parts of methanol-methyl methacrylate azeotrope were removed through the fractionation column at a vapor temperature of 65° to 68° C. The crude product was then distilled through a simple distillation head under reduced pressure to yield 834.2 parts (90% of theory) of beta-(diethylamino)ethyl methacrylate having a boiling range of 90° to 125.5° C. at 50 mm.

In carrying out the reaction of this example, aluminum isopropoxide is completely ineffective as an interchange catalyst. In conducting this reaction, the catalysts used, before the advent of tetra-isopropyl titanate, were methanolic sodium methoxide and sodium beta-(diethylamino)ethoxide in beta-(diethylamino)ethanol. However, tetra-isopropyl titanate shows three distinct advantages over these sodium catalysts:

(1) The sodium catalysts are heterogeneous since they precipitate when added to the interchange mixture and hence soon lose their catalytic activity apparently through a decrease in surface area. Thus, the sodium catalysts must be added continuously to the interchange mixture throughout the course of the reaction. With tetra-isopropyl titanate, the catalyst is added initially in one portion and effectively catalyzes the entire reaction;

(2) With the sodium catalyst, it has been found necessary to neutralize the alkaline catalyst and to remove the resulting inorganic salts by filtration before distilling the product to avoid the destructive action upon the product. With tetra-isopropyl titanate, the catalyst is completely benign and the product may be safely distilled from the catalyst residue without any destructive action or lowering of the yield being observed.

(3) Finally, the sodium catalysts cause an undesirable side reaction thought to be the addition of alcohol residues across the double bond of the product. This side reaction does not take place in the presence of tetra-isopropyl titanate.

*Example IV*

In a 5-liter flask equipped with a stirrer, a thermometer, and a short, packed fractionation column were placed 1200 parts of a mixture of normal, long-chain alcohols derived from hydrogenated cocoanut oil in the $C_{10}$ to $C_{18}$ range, averaging $C_{13}$, 1800 parts of methyl methacrylate, one part of phenothiazine as a polymerization inhibitor and 12 parts of tetra-isopropyl titanate. (The use of phenothiazine as a polymerization inhibitor is no part of this invention.) The charge was heated to reflux over a period of six and one-half hours and 322 parts of methanol-methyl methacrylate azeotrope were removed at a vapor temperature of 65–68° C. After stripping off the excess methyl methacrylate under reduced pressure, deactivating the polymerization inhibitor, and decolorizing with activated carbon, a technical grade of lauryl methacrylate was obtained as a clear, almost colorless oil. The lauryl methacrylate was composed of a mixture of methacrylates based on the contents of the long-chain alcohols.

*Example V*

Two hundred (200) grams (1.03 mols) of dimethyl-terephthalate, 220 grams (4.78 mols) of ethylene glycol, and 0.1 gram of tetra-butyl titanate catalyst were mixed in a flask and heated to distill off methanol. After two and one-half hours, 63 grams of methanol were recovered at a final pot temperature of 214° C. The resulting monomeric bis-(beta-hydroxy)diethyl terephthalate was colorless. On further heating the monomeric bis-(beta-hydroxy)diethyl terephthalate was polymerized in the presence of the titanium ester catalyst remaining in the mass, possibly then in the form of ethylene glycol titanate, to form ethylene glycol terephthalate polymer, i. e.,

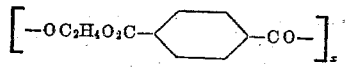

This heating was carried out at a pressure of 0.5 to 1.0 mm. mercury for a period of two hours, reaching a final temperature of 275° C. Ethylene glycol was evolved during the polymerization and the polyester remaining in the flask was found suitable for spinning into strong filaments. The titanium ester catalyst gave more complete displacement of the methanol than basic catalysts.

*Example VI*

One hundred and fifty (150) grams of ethyl benzoate and 150 grams of butyl acetate were heated to 100° C. in a boiling flask under a packed column and still head. After fifteen minutes at 100° C., no significant amount of refluxing was noted in the column. Six (6) grams of tetra-isopropyl titanate were added, whereupon refluxing began almost at once and 85 grams of ethyl acetate followed by the excess butyl acetate were distilled off. The flask residue weighing 185 grams was distilled at reduced pressure yielding butyl benzoate in 95% of theory.

*Example VII*

Example I was repeated but 7.5 grams of a polytitanium-isopropoxy-stearate was used as catalyst instead of the tetra-isopropyl titanate. This polymeric compound, prepared from tetra-isopropyl titanate and stearic acid was believed to have the formula:

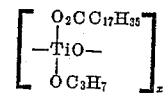

where $x$ averaged about 60. Its catalytic activity in this interchange reaction was somewhat less than that for the tetraisopropyl titanate. The reaction yielded about 45 ml./hr. of ethanol as compared with more than 84 ml./hr. in Example I.

*Example VIII*

Thirteen hundred (1300) parts by weight of 2-ethyl-hexanol, 2000 parts by weight of methyl methacrylate, 20 parts by weight of propyl polytitanate, and 200 parts by weight of p-phenylenediamine inhibitor were gently heated to reflux under a distilling column and the binary mixture of methanol-methyl-methacrylate distilled off. The propyl polytitanate used as an ester interchange catalyst had approximately the following empirical structure as indicated by the carbon and titanium analysis:

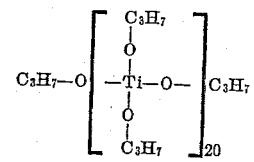

It was prepared by adding a limited amount of water to orthopropyl titanate and eliminating propanol. Following the removal of the binary mixture from the interchange reaction, the excess of methyl methacrylate was distilled off. The residue was washed with water and clarified to remove the inhibitor and the polyester catalyst and dried. The product 2-ethylhexyl methacrylate was recovered as a clear liquid monomer which was suitable for polymerization or co-polymerization especially with other methacrylate esters.

*Example IX*

One hundred (100) grams of tetra-ethyl silicate and 200 grams of n-butanol were placed in a boiling flask under a distilling column. On heating to full reflux, the head temperature remained at 116° C. for twenty minutes indicating the simple refluxing of the butanol. Five (5) ml. of tetra-isopropyl titanate were then added to the flask. Almost immediately the head temperature dropped to 77° C. and ethanol was taken off at a maximum rate of 72 ml./min. until the head temperature again rose to 116° C. There were recovered 89.8 grams of ethanol, corresponding to over 98% conversion of tetra-ethyl silicate to butyl silicate.

The type of titanium compound catalyst which may be used in accordance with this invention had been broadly described above as any compound which contains at least one organic titanium ester linkage per molecule. This, therefore, includes ortho esters of the general type Ti(OR)₄ where R is an organic radical particularly an aliphatic hydrocarbon group. In this case, it is not necessary that all the R groups on the Ti be the same. The condensed esters, or polytitanic acid esters of the type which are prepared by reacting a tetra ester with less than the equivalent quantity of water are also very effective catalysts of the same general type. The catalyst used in Example VIII is a typical polytitanate. It is not necessary, however, to adhere to the linear structure for branching and cross-linked polymer structures are also effective and are probably all present in the usual preparation of this type. The ester linkages can be much further reduced by hydrolysis without destroying the catalytic activity. The so-called titanium ester carboxylates or titanium ester acylates also fall within this general group of catalytic substances. These may be formed by reacting a titanium ortho ester with a fatty acid, during which reaction a portion of the alcohol is displaced. Such a catalyst is used in Example VII. They are usually polymeric and when one ester linkage remains per titanium atom the catalytic activity is quite high. Further polymerization by heating to eliminate an ester will cause cross linking and a decrease in ester linkage/Ti ratio until the catalytic activity finally fades away as the ester linkages approach zero. This type is more suitable where reaction temperatures are relatively high and since they are only partially hydrolyzed by water they may be left in a washed product such as a poly ester or resinous product with only a minor effect probably similar to that of a plasticizer.

There has been found a considerable variation in catalytic activity of the titanium esters, depending largely on their auxiliary structures. Generally, the ortho esters are most active, that is, they catalyze the ester interchange reactions more rapidly and at lower temperatures than many of the previously known catalysts. The condensed esters of titanium, e. g., propyl polytitanate, are somewhat less active while the ester carboxylates of the type used in Example VII are still less active but become suitably active at the higher temperatures. Thus, for systems that are susceptible to undesirable side reactions caused by the higher temperatures the use of orthotitanates is preferred. When higher temperatures are permissible, the ester carboxylates are satisfactory and have the additional advantage that, while the true ester linkage is destroyed by moisture, the resulting hydroxy carboxylate is then stable to further hydrolysis and the deactivated catalyst remains in clear admixture with the product rather than causing a pigmented appearance which may result when complete hydrolysis occurs. In this way the ester carboxylates are well suited for producing polyesters which are not ultimately distilled since they may remain harmlessly in the product.

The titanium ester compound is effective as an ester interchange catalyst in widely varying amounts. For economic and other reasons, it is desirable to use as little as possible. As a rule, the more active ortho esters may be used in smaller amounts than the ester carboxylates. For the purposes of this invention, there is no limit on the quantity used. It has been found, however, that for most uses the amount of titanium ester catalyst required is between about 0.01% and 5% by weight of the initial interchange ester used.

The structure of the titanium compound which may be used as the interchange catalyst may vary considerably. The primary requirement is the presence of at least one titanium ester linkage,

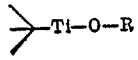

per molecule of the catalyst substance. Hence, these compounds have been designated herein as titanium ester compounds. Thus, in the case of the condensed polytitanium esters, strong catalytic activity exists when there are as few as one ester linkage for each titanium atom. The same is true for the polytitanium ester carboxylates. Catalytic activity still exists even when the ratio of ester linkages to titanium atoms is less than one and is useful especially when the reaction temperature is relatively high. It is preferred that the titanium ester is not completely chelated, in which case the catalytic activity is hindered particularly at low temperatures. For example, in the tetraester prepared from 1,3-octylene glycol and tetraisopropyl titanate, two of the hydroxyl groups chelate, thus filling all six of the coordination positions of the titanium atom. When these six positions are all satisfied, the catalytic activity is very low or entirely gone. However, by use of elevated temperatures, this complex structure is at least partially disrupted and catalysis is observed. In similar compounds, where the ratio of the glycol to the titanium atom is less than four, catalytic activity is more pronounced.

Although it is usually simplest to add an ortho-ester of titanic acid such as tetraisopropyl titanate, it is believed that interchange occurs between this ester and other esters and alcohols present in the reaction mixture, and the resulting titanates or mixed titanates are also catalysts and are so considered in this invention. Consequently, it is sometimes feasible in the interests of reducing contamination to use a titanium ester of the same alcohol which occurs in the organic ester product.

Since the experimental evidence suggests that the titanium atom should have at least one of its six coordination positions effectively vacant to achieve catalysis, it is believed that the catalytic action involves the formation of a coordination complex between the titanium compound and the ester of the interchange reaction. This complex is then sufficiently unstable to permit easy interchange of the ester components in the reaction mixture. When one of the reaction products is relatively volatile, it is removed by distillation and the equilibrium reaction is rapidly completed.

These titanium ester catalyst compounds are useful in ester interchange reactions wherein one organic ester linkage of the type RCOOR' is broken and another formed. Similar advantages are found in catalyzing interchange of esters of silicic acid. The reaction may result from the interaction of two esters to form two new esters. It may also be the reaction between an ester and an alcohol with the liberation of the initially esterified alcohol. One particularly useful reaction that is catalyzed by these titanium ester compounds is the formation of a polyester by the interaction of a dimethyl ester of a dicarboxylic acid with a glycol one case of which is given in Example V.

Ester interchange reactions have many practical uses, only a few of which are shown in the accompanying examples. Many important products can be made by this type of reaction provided it is catalyzed by a substance which has no deleterious effect on reactants or products. The older types of esterification and ester interchange catalysts were usually acids or bases which were unsatisfactory with certain reactive compounds such as the derivatives of acrylic acid, allyl alcohol, etc. More neutral compounds such as calcium carbonate have been found somewhat effective but they generally involve a difficult separation step after the reaction. Aluminum alkoxides have been used with some success in these sensitive systems. It has been found, however, that the titanium ester compounds, particularly the ortho esters, are relatively more effective and substantially harmless to highly reactive unsaturated compounds. The following catalysts are compared as to their relative activity in the reaction between ethyl benzoate and butanol, using the catalyst in amounts equal to 5% of the weight of the benzoate in each run.

| Catalyst | Max. rate of ethanol removal, ml./hr. |
|---|---|
| Tetraisopropyl titanate | [1] >84 |
| Butyl zirconate | 0 |
| Aluminum isopropoxide | 70 |
| Tetraethyl silicate | 10 |
| Tributyl borate | 0 |
| Tributyl antimonite | 0 |
| Polyisopropyl titanate | >84 |

[1] 84 ml./hr. was the capacity of the column used.

The titanium ester catalysts of this invention possess several advantages in addition to relatively high catalytic activity. They are readily removed or deactivated at the end of the interchange reaction. For example, simple treatment with water destroys the ester linkage and leaves no acid or alkali. Where the product is polymeric and not distillable a titanium ester catalyst may be chosen which remains substantially invisible in the product. These catalysts are generally inert toward auxiliary functional substituents, for example, active hydrogen and unsaturated groups. There is a minimum of deleterious material left in the reaction product. These improved ester interchange catalysts are more easily prepared and purified than most of the previously known alkoxide and metal hydride catalysts. Furthermore, they do not involve a hazardous condition such as spontaneous ignition. The titanium ester compounds provide a series of catalysts which function suitably over a considerable range of temperatures. Thus, the ortho esters are best suited to low temperature reactions although they are also well suited to use at most organic reaction temperatures. On the other hand, if there is a process reason for desiring the catalytic action to appear only at a higher temperature, one of the ester carboxylates may be used.

Reference in the specification and claims to parts, proportions, and percentages, unless otherwise specified, refers to parts, proportions and percentages by weight.

Since it is obvious that many changes and modifications can be made in the above-described details without departing from the nature and spirit of the invention, it is to be understood that the invention is not to be limited to said details except as set forth in the appended claims.

I claim:

1. The process which comprises adding tetraisopropyl titanate to dimethyl terephthalate and ethylene glycol and heating the mass to a temperature above the boiling point of methanol until the mass no longer evolves methanol whereby to produce monomeric bis-(beta-hydroxy)-diethyl terephthalate, then further heating the mass to a temperature at which ethylene glycol is evolved until said monomer is polymerized to ethylene glycol terephthalate polymer.

2. In a process of conducting an ester interchange reaction between an ester of a carboxylic acid and a compound selected from the group consisting of alcohols and esters of carboxylic acids as reactants, said ester interchange reaction producing a by-product more volatile than said reactants, the improvement which comprises incorporating with the reactants a catalytic amount of an alkyl ortho titanate, heating to effect an ester interchange, and distilling off the more volatile by-product.

3. In a process of conducting an ester interchange reaction between an ester of a carboxylic acid and an alcohol, the alcoholic residue of said ester forming an alcohol more volatile than said reacting alcohol, the improvement which comprises incorporating with the reactants a catalytic amount of an alkyl ortho titanate, heating to effect an ester interchange, and distilling off the more volatile alcohol.

4. In a process of conducting an ester interchange reaction between an ester of a carboxylic acid and a compound selected from the group consisting of alcohols and esters of carboxylic acids as reactants, said ester interchange reaction producing an ester other than the first-named ester, the improvement which comprises incorporating with the reactants a catalytic amount of an alkyl orthotitanate, and effecting the ester interchange reaction.

5. In a process of conducting an ester interchange reaction between a reactant alcohol and a carboxylic acid ester of an alcohol other than said reactant alcohol, the improvement which comprises incorporating with the reactants a catalytic amount of an alkyl orthotitanate, and effecting the ester interchange reaction.

6. The process of claim 4 in which the alkyl ortho ester is tetra isopropyl titanate.

7. The process of claim 4 in which the alkyl ortho ester is tetra n-butyl titanate.

8. In a process of conducting an ester interchange reaction between a glycol and a dicarboxylic acid ester of an alcohol other than said glycol, the improvement which comprises incorporating with the reactants a catalytic amount of an alkyl ortho titanate, and heating to effect the ester interchange reaction.

9. In a process of conducting an ester interchange reaction between dimethyl terephthalate and ethylene glycol, the improvement which comprises incorporating with the reactants a catalytic amount of an alkyl ortho titanate, and heating to effect the ester interchange reaction.

10. In the process of conducting an ester interchange reaction between a beta dialkylamino alcohol and a methacrylate ester of an alcohol other than said amino alcohol, the improvement which comprises incorporating with the reactants a catalytic amount of an alkyl ortho titanate, and heating to effect the ester interchange reaction.

11. In the process of conducting an ester interchange reaction between methyl methacrylate and beta-(diethylamino) ethanol, the improvement which comprises incorporating with the reactants a catalytic amount of an alkyl ortho titanate, and heating to effect the ester interchange reaction.

12. The process of claim 10 in which the alkyl ortho ester is tetra isopropyl titanate.

13. The process of claim 10 in which the alkyl ortho ester is tetra n-butyl titanate.

References Cited in the file of this patent

UNITED STATES PATENTS

| 2,465,319 | Whinfield et al. | Mar. 22, 1949 |
| 2,614,112 | Boyd | Oct. 14, 1952 |
| 2,621,193 | Langkammerer | Dec. 9, 1952 |
| 2,680,723 | Kronstein | June 8, 1954 |

OTHER REFERENCES

Kraitzer et al.: Paint Notes, October 1947 (pages 348–56).

Groggins: Unit Processes in Org. Synthesis (3rd ed.), 1947 (pages 636–637).